(12) United States Patent
Hebert et al.

(10) Patent No.: US 10,525,667 B2
(45) Date of Patent: Jan. 7, 2020

(54) SURFACING FILM FOR COMPOSITES WITH BARRIER LAYER

(75) Inventors: Larry S. Hebert, Hudson, WI (US); Naiyong Jing, Woodbury, MN (US); Michael D. Swan, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1431 days.

(21) Appl. No.: 12/637,879

(22) Filed: Dec. 15, 2009

(65) Prior Publication Data

US 2010/0151239 A1    Jun. 17, 2010

Related U.S. Application Data

(60) Provisional application No. 61/122,633, filed on Dec. 15, 2008.

(51) Int. Cl.
  *B32B 27/08* (2006.01)
  *B32B 7/12* (2006.01)

(52) U.S. Cl.
  CPC ............ *B32B 7/12* (2013.01); *Y10T 156/10* (2015.01); *Y10T 428/2835* (2015.01);
  (Continued)

(58) Field of Classification Search
  CPC . Y10T 428/2835; Y10T 156/10; B32B 27/12; B32B 27/04; C09J 7/04
  (Continued)

(56) References Cited

U.S. PATENT DOCUMENTS

| | | |
|---|---|---|
| 3,018,262 A | 1/1962 | Schroeder |
| 3,117,099 A | 1/1964 | Proops et al. |

(Continued)

FOREIGN PATENT DOCUMENTS

| | | |
|---|---|---|
| EP | 0 650 987 | 5/1995 |
| EP | 1586615 A1 | 10/2005 |

(Continued)

OTHER PUBLICATIONS

Gupta, V. K.; "Advances in Composite Surfacing", Technical paper presented by Vinod Gupta, 3M Product Development Specialist, at the SME Composites Manufacturing and Tooling Event Jan. 30, 1995.

"Modifications of Polymer Surfaces: Mechanisms of Wettability and Bondability Improvements", Polymer Interface and Adhesion, Souheng, Wu, Ed., Marcel Dekker, Inc., NY and Basel, 1982, pp. 279-336.

(Continued)

*Primary Examiner* — Samir Shah
(74) *Attorney, Agent, or Firm* — Philip P. Soo

(57) ABSTRACT

Fiber reinforced resin matrix composite laminates are provided comprising: at least one layer of fiber reinforced resin matrix comprising a cured resin matrix; and a surfacing construction bound to the cured resin matrix and forming a surface of the laminate, comprising: at least one barrier layer; and at least one cured adhesive layer derived from high temperature cure adhesive. In some embodiments, barrier layer(s) may be substantially impermeable to organic solvents, water, and/or gasses. In another aspect, fiber reinforced resin matrix composite laminates are provided comprising: a) at least one layer of fiber reinforced resin matrix comprising a cured resin matrix; and b) a surfacing construction bound to the cured resin matrix and forming a surface of the laminate, comprising: at least one barrier layer; and at least one electrically conductive layer. In another aspect, a surfacing construction is provided comprising a barrier layer and a curable adhesive layer.

8 Claims, 5 Drawing Sheets

(52) U.S. Cl.
CPC .. *Y10T 428/3154* (2015.04); *Y10T 428/31504* (2015.04); *Y10T 428/31515* (2015.04)

(58) Field of Classification Search
USPC ........................................................ 428/351
See application file for complete search history.

(56) References Cited

U.S. PATENT DOCUMENTS

| | | | |
|---|---|---|---|
| 3,257,266 | A | 6/1966 | Sapper |
| 3,421,971 | A | 1/1969 | Kamal |
| 3,421,973 | A | 1/1969 | Kamal |
| 4,479,163 | A | 10/1984 | Bannink, Jr. et al. |
| 4,755,904 | A | 7/1988 | Brick |
| 4,986,496 | A | 1/1991 | Marentic et al. |
| 5,132,164 | A | 7/1992 | Moriya et al. |
| 5,133,516 | A | 7/1992 | Marentic et al. |
| 5,262,232 | A * | 11/1993 | Wilfong et al. ............. 428/327 |
| 5,370,921 | A | 12/1994 | Cedarleaf |
| 5,470,413 | A * | 11/1995 | Cedarleaf .................. 156/90 |
| 5,512,225 | A | 4/1996 | Fukushi |
| 5,548,769 | A | 8/1996 | Baum et al. |
| 5,650,483 | A | 7/1997 | Malik et al. |
| 5,660,667 | A | 8/1997 | Davis |
| 5,837,181 | A | 11/1998 | Leimbacher et al. |
| 5,972,176 | A | 10/1999 | Kirk et al. |
| 6,287,664 | B1 | 9/2001 | Pratt |
| 6,439,550 | B1 * | 8/2002 | Koch ...................... 267/64.23 |
| 6,630,047 | B2 | 10/2003 | Jing et al. |
| 6,685,793 | B2 | 2/2004 | Jing |
| 6,790,526 | B2 | 9/2004 | Vargo et al. |
| 6,986,947 | B2 | 1/2006 | Jing et al. |
| 7,141,303 | B2 | 11/2006 | Clemens et al. |
| 2001/0049408 | A1 | 12/2001 | Jing |
| 2002/0179240 | A1 | 5/2002 | Clemens et al. |
| 2002/0081921 | A1 | 6/2002 | Vargo |
| 2002/0197481 | A1 | 12/2002 | Jing et al. |
| 2003/0152766 | A1 | 8/2003 | Vargo |
| 2004/0126541 | A1 | 7/2004 | Dietz et al. |
| 2004/0235376 | A1 * | 11/2004 | Byma et al. ................... 442/38 |
| 2005/0106965 | A1 * | 5/2005 | Wevers et al. ................ 442/85 |
| 2005/0186376 | A1 * | 8/2005 | Rhee et al. ................ 428/36.9 |
| 2005/0238872 | A1 * | 10/2005 | Kennedy et al. ............ 428/336 |
| 2006/0101758 | A1 * | 5/2006 | Egan ................. E04F 13/0885 52/408 |
| 2006/0182949 | A1 | 8/2006 | Salnikov et al. |
| 2007/0093163 | A1 | 4/2007 | Brown |
| 2007/0141313 | A1 | 6/2007 | Burki et al. |
| 2007/0141927 | A1 | 6/2007 | Brown |
| 2008/0139722 | A1 | 6/2008 | Shefelbine et al. |
| 2008/0277057 | A1 | 11/2008 | Montgomery et al. |
| 2009/0109537 | A1 | 4/2009 | Bright et al. |
| 2011/0261551 | A1 * | 10/2011 | Chirila et al. ................. 361/818 |

FOREIGN PATENT DOCUMENTS

| | | |
|---|---|---|
| EP | 1657287 A2 | 5/2006 |
| JP | S 60-122149 | 6/1985 |
| JP | 02-209235 | 8/1990 |
| JP | 2001/280509 A | 10/2001 |
| JP | 2009-264692 | 11/2009 |
| WO | WO 99/64235 | 12/1999 |
| WO | WO 2001/096487 A2 | 12/2001 |
| WO | WO 02/070623 | 9/2002 |
| WO | WO 2002/070623 A2 | 12/2002 |
| WO | WO 2005/073330 | 8/2005 |
| WO | WO 2006/088704 A1 | 8/2006 |
| WO | WO 2006/107812 | 10/2006 |
| WO | WO 2008/115301 A2 | 9/2008 |
| WO | WO 2010/075059 A1 | 7/2010 |

OTHER PUBLICATIONS

Encyclopedia of Polymer Science and Engineering, Second Edition, Supplemental Volume, John Wiley & Sons, 1989, pp. 674-689.
U.S. Appl. No. 61/122,637, "Composite Article Including Viscoelastic Layer with Barrier Layer", filed Dec. 15, 2008.
U.S. Appl. No. 12/637,915, "Composite Article Including Viscoelastic Layer with Barrier Layer", filed Dec. 15, 2009.
U.S. Appl. No. 61/118,242, "Surfacing Film for Composite Structures", filed Nov. 26, 2008.
U.S. Appl. No. 12/625,002, "Surfacing Film for Composite Structures", filed Nov. 24, 2009.
U.S. Appl. No. 61/170,352, "Lightning Protection Sheet with Patterned Conductor", filed Apr. 17, 2009.
U.S. Appl. No. 12/761,162, "Lightning Protection Sheet with Patterned Conductor", filed Apr. 15, 2010.
U.S. Appl. No. 61/170,360, "Lightning Protection Sheet with Patterned Discriminator", filed Apr. 17, 2009.
U.S. Appl. No. 12/761,212, "Lightning Protection Sheet with Patterned Discriminator", filed Apr. 15, 2010.
U.S. Appl. No. 61/286,420, "Fluoropolymer Film with Dicyandiamide-cured Epoxy Adhesive", filed Dec. 15, 2009.
International Search Report, PCT/US2009/067995, International Filing Date: Dec. 15, 2009, 4 pages.
Anonymous: "Permeability of Polymers", Polymer Properties Database, Jan. 1, 2015, pp. 1-3 XP055418473—retrieved from the Internet: URL:http://polymerdatabase.com/polymer_physics/Permeability.html [retrieved on Oct. 24, 2017].

* cited by examiner

SURFACING FILM FOR COMPOSITES WITH BARRIER LAYER

CROSS REFERENCE TO RELATED APPLICATION

This application claims the benefit of U.S. Provisional Patent Application No. 61/122,633, filed Dec. 15, 2008, the disclosure of which is incorporated by reference herein in it entirety.

FIELD OF THE DISCLOSURE

This disclosure relates to fiber reinforced resin matrix composite laminates, which include a surfacing construction (surfacing film) which comprises at least one barrier layer.

BACKGROUND OF THE DISCLOSURE

The use of fiber reinforced resin matrix or fiber reinforced plastic (FRP) matrix composite laminates ("composites") has become widely accepted for the variety of applications in aerospace, automotive and other transportation industries because their light weight, high strength and stiffness. Weight reduction benefits and performance enhancements are the biggest drivers behind implementation of fiber reinforced resin matrix composite laminates into industrial applications. Various airspace components being manufactured from fiberglass and carbon fibers reinforced composites including airplane fuselage sections and wing structures. Composites are used to fabricate many parts for airplanes, wind generators, automobiles, sporting goods, furniture, buses, trucks, boats, train cars and other applications where stiff, light-weight materials, or consolidation of parts are beneficial. Most often the fibers are made of carbon, glass, ceramic or aramid, and the resin matrix is an organic thermosetting or thermoplastic material. These parts are typically manufactured under vacuum and/or pressure at temperatures from 20° C. to 180° C., occasionally up to 230° C., and occasionally up to 360° C.

SUMMARY OF THE DISCLOSURE

Briefly, the present disclosure provides a fiber reinforced resin matrix composite laminate comprising: a) at least one layer of fiber reinforced resin matrix comprising a cured resin matrix; and b) a surfacing construction bound to the cured resin matrix and forming a surface of the laminate, comprising: i) at least one barrier layer; and ii) at least one cured adhesive layer derived from high temperature cure adhesive. Typically the cured adhesive layer is bound to the cured resin matrix. Typically the barrier layer(s) have a composition different from that of the cured adhesive layer(s), the barrier layer(s) have a composition different from that of the cured resin matrix, and the cured adhesive layer(s) have a composition different from that of the resin matrix. In some embodiments, the one or more barrier layer(s) may be substantially impermeable to organic solvents, and/or substantially impermeable to water, and/or substantially impermeable to gasses. In some embodiments, the surfacing construction additionally comprises one or more of an electrically conductive layer, an EMI shield layer, a UV protection layer, or a viscoelastic layer. In some embodiments, the barrier layer may comprise a fluoropolymer, which may be per-fluorinated and may be non-perfluorinated. In some embodiments, the cured adhesive layer comprises a dicyandiamide-cured epoxy adhesive. In some embodiments, the cured adhesive layer comprises no cured epoxy adhesive which is amine-cured epoxy adhesive.

In another aspect, the present disclosure provides a method of making a fiber reinforced resin matrix composite laminate comprising the steps of: a) providing a curable fiber reinforced resin matrix comprising a curable resin matrix; b) providing a surfacing construction comprising: i) at least one barrier layer; and ii) at least one curable adhesive layer; c) providing a tool having a shape which is the inverse of the desired shape of the laminate; e) laying up the surfacing construction and the curable fiber reinforced resin matrix in the tool, in no particular chronological order, but with the surfacing construction in contact with the tool and with at least one curable adhesive layer in contact with the curable fiber reinforced resin matrix; and f) curing the curable resin matrix and curable adhesive layer to make a fiber reinforced resin matrix composite laminate. Typically, the barrier layer(s) have a composition different from that of the curable adhesive layer(s) and the barrier layer(s) have a composition different from that of the cured resin matrix. In some embodiments, at least one curable adhesive layer has a composition different from that of the curable resin matrix. In some embodiments, the one or more barrier layer(s) may be substantially impermeable to organic solvents, and/or substantially impermeable to water, and/or substantially impermeable to gasses. In some embodiments, the surfacing construction additionally comprises one or more of an electrically conductive layer, an EMI shield layer, a UV protection layer, or a viscoelastic layer. In some embodiments, the barrier layer may comprise a fluoropolymer, which may be per-fluorinated and may be non-perfluorinated. In some embodiments, the curable adhesive layer comprises an epoxy adhesive and a dicyandiamide curative. In some embodiments, the curable adhesive layer comprises no amine-containing curative. In some embodiments, at least one, and in some cases all, curable adhesive layer(s) have a composition different from that of the curable resin matrix. In some embodiments, at least one, and in some cases all, curable adhesive layer(s) have a composition which is the same as that of the curable resin matrix. In some embodiments, at least one, and in some cases all, curable adhesive layer(s) are the curable resin matrix. In some embodiments, at least one, and in some cases all, curable adhesive layer(s) are not the curable resin matrix.

In another aspect, the present disclosure provides a fiber reinforced resin matrix composite laminate comprising: a) at least one layer of fiber reinforced resin matrix comprising a cured resin matrix; and b) a surfacing construction bound to the cured resin matrix and forming a surface of the laminate, comprising: i) at least one barrier layer; and iii) at least one electrically conductive layer. Typically, the barrier layer(s) have a composition different from that of the cured resin matrix. In some embodiments, the one or more barrier layer(s) may be substantially impermeable to organic solvents, and/or substantially impermeable to water, and/or substantially impermeable to gasses. In some embodiments, the surfacing construction additionally comprises one or more of a cured adhesive layer, a UV protection layer, or a viscoelastic layer. In some embodiments, the barrier layer may comprise a fluoropolymer, which may be per-fluorinated and may be non-perfluorinated.

In another aspect, the present disclosure provides a surfacing construction comprising at least one barrier layer and at least one curable adhesive layer. In some embodiments, the one or more barrier layer(s) may be substantially impermeable to organic solvents, and/or substantially impermeable to water, and/or substantially impermeable to gasses. In some embodiments, the surfacing construction additionally comprises one or more of an electrically conductive layer, an EMI shield layer, a UV protection layer, or a viscoelastic layer. In some embodiments, the barrier layer may comprise a fluoropolymer, which may be per-fluorinated and may be non-perfluorinated. In some embodiments, the curable adhesive layer comprises an epoxy adhesive and a dicyandiamide curative. In some embodiments, the curable adhesive layer comprises no amine-containing curative.

DETAILED DESCRIPTION

Figure 1:
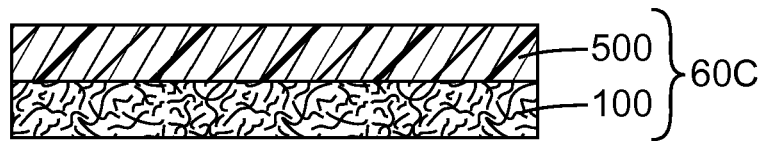
FIG. 1 is schematic depiction of a comparative composite laminate as described in the Examples below.

Fiber reinforced resin matrix or fiber reinforced plastic (FRP) matrix composite laminates ("composites") has become widely accepted for the variety of applications in aerospace, automotive and other transportation industries because their light weight, high strength and stiffness. However, during cure, pin-holes may form in the surface layers of such parts. Such defects adversely affect the appearance of the surface and function as a path for unwanted fluids to penetrate and degrade the performance of the part. These pin-holes must be eliminated in a separate operation to fill and/or abrade the surface smooth.

During flight aircraft surfaces can build up large amounts of static charge. On metal structures this is conducted away by the metal. On composite structures a conductive layer of paint may be applied to the surface to address this issue. In some embodiments, the composite according to the present disclosure includes a surfacing film which includes one or more electrically conductive layers. Typically, such a composite does not comprise an electrically conductive or static dissipating coating such as a paint.

Unprotected composite parts can be damaged by UV radiation, e.g. sunlight. To overcome this problem the parts may be protected with a UV protective coating, paint or covering. In some embodiments, the composite according to the present disclosure includes a surfacing film which includes one or more UV absorbing or reflecting layers. Typically, such a composite does not comprise a UV protective coating, paint or covering and may require no additional protection from exposure to UV or sunlight.

Aluminum or metallic exterior vehicle structures shield interior systems and payloads from EMI as well as containing internally generated field from radiating beyond the vehicle. Many composite parts do not provide this same level of shielding as metallic structure. This shielding is often developed by including a woven metallic fabric of expand metallic foil in the structure. A conductive barrier layer may eliminate the requirements for such added elements. In some embodiments, the composite according to the present disclosure includes a surfacing film or barrier layer which includes one or more conductive or EMI blocking layers. Typically, such a composite does not comprise a conductive or EMI blocking layers elsewhere in the composite structure.

The present disclosure provides a surfacing construction which comprises at least one polymeric barrier layer and at least one curable layer for use in the manufacture of composite parts, methods of using the surfacing construction in the manufacture of composite parts, and composite parts made with or bearing such surfacing constructions before or after cure. The surfacing construction has a thickness of less than 10 mil, more typically less than 6 mil, more typically less than 4 mil, more typically less than 3 mil, more typically less 2 mil, more typically less than 1 mil, in some embodiments less than 0.75 mil, in some embodiments less than 0.60 mil, in some embodiments less than 0.50 mil, in some embodiments less than 0.25 mil, in some embodiments less than 0.10 mil, in some embodiments less than 0.05 mil, and in some embodiments less than 0.01 mil. The surfacing construction typically has a thickness of at least 0.001 mil.

Curable Layer

The curable layer of the present disclosure comprises a thermally or moisture curable adhesive on at least one surface of the barrier layer. Examples of such curable adhesives include epoxy resins (a mixture of epoxide resin and curing agent), acrylates, cyano-acrylates, and urethanes. The curable adhesives used in the process of the present disclosure are non-tacky to the touch after curing and are thermosetting, that is cure through the action of heat, catalysts, UV light, and the like. Epoxide resins useful in the protective articles of this disclosure are any organic compounds having at least one oxirane ring, that is, polymerizable by a ring opening reaction. Such materials, broadly called epoxides, include both monomeric and polymeric epoxides and can be aliphatic, heterocyclic, cycloaliphatic, or aromatic and can be combinations thereof. They can be liquid or solid or blends thereof, blends being useful in providing tacky adhesive films prior to cure. These materials generally have, on the average, at least two epoxy groups per molecule and are also called "polyepoxides." The polymeric epoxides include linear polymers having terminal epoxy groups (for example, a diglyciclyl ether of a polyoxyalkylene glycol), polymers having skeletal oxirane units (for example, polybutadiene polyepoxide), and polymers having pendent epoxy groups (for example, a glycidyl methacrylate polymer or copolymer). The molecular weight of the epoxy resin may vary from about 74 to about 100,000 or more. Useful epoxide resins include those which contain cyclohexene oxide groups such as the epoxycyclohexane carboxylates, typified by 3,4-epoxycyclohexylmethyl-3,4-epoxycyclohexane carboxylate, 3,4-epoxy-2-n~ethylcyclohexylmethyl-3,4-epoxy-2-methycyclohexane carboxylate, and bis(3,4-epoxy-6-methylcyclohexylmethyl)adipate. For a more detailed list of useful epoxies of this nature, reference may be made to U.S. Pat. No. 3,117,099. Further epoxide resins which are particularly useful in the practice of this disclosure include glycidyl ether monomers of the formula:

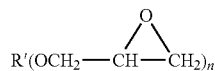

where R' is aliphatic, for example, alkyl; aromatic, for example, uyl; or combinations thereof, and n is an integer of 1 to 6. Examples are the glycidyl ethers of polyhydric phenols such as the diglycidyl ether of 2,2-bis-(4-hydroxyphenol)propane (Bisphenol A) and copolymers of (chloromethyl)oxirane and 4,4'-(1-n1et1~ylethylidene)bisphenol. Further examples of epoxides of this type which can be used in the practice of this disclosure are described in U.S. Pat. No. 3,018,262.

There are a host of commercially available epoxide resins that can be used in this disclosure. In particular, epoxides which are readily available include styrene oxide, vinylcyclohexene oxide, glycidol, glycidyl methacrylate, diglycidyl ether of Bisphenol A (for example, those available under the trade designations "EPON S28", "EPON 1004", 5 and "EPON 1001F" from Shell Chemical Company, and "DER-332" and "DER-334", from Dow Chemical Company), diglycidyl ether of Bisphenol F (for example, those under the trade designations "ARALDITE GY28 1" from Ciba-Geigy Corporation, and "EPON 862" from Shell Chemical Company), vinylcyclohexane dioxide (for example, having the trade designation "ERL-4206" from Union Carbide Corporation), 3,4-epoxycyclohexyl-methyl-3,4-epoxycyclohexene carboxylate (for example, having the trade designation "ERL-4221" from Union Carbide Corporation), 2-(3,4-epoxycyclohexyl-5,5-spiro-3,4-epoxy)cyclohexanemetadioxane (for example, having the trade designation "ERL-4234" from Union Carbide Corporation), bis(3,4-epoxycyclohexyl)adipate (for example, having the trade designation "ERL-4299" from Union Carbide Corporation), dipentene dioxide (for example, having the trade designation "ERL-4269" from Union Carbide Corporation), epoxidized polybutadiene (for example, having the trade designation "OXIRON 2001" from FMC Corporation), flame retardant epoxide resins (for example, having the trade designation "DER-542", a brominated bisphenol type epoxy resin available from Dow Chemical Company), 1,4-butanediol diglycidyl ether (for example, having the trade designation "ARALDITE RD-2" from Ciba-Geigy Corporation), diglycidyl ether of hydrogenated Bisphenol A based epoxide resins (for example, having the trade designation "EPONEX 1510 from Shell Chemical Company), and polyglycidyl ether of phenol-formaldehyde novolak (for example, having the trade designations "DEN-43 1" and "DEN-438" from Dow Chemical Company)

The term "Curing agent" is used broadly to include not only those materials that are conventionally regarded as curing agents but also those materials that catalyze epoxy polymerization as well as those materials that may act as both curing agent and catalyst. Preferred curing agents for the epoxide resin include, for example, room temperature curing agents, heat-activated curing agents, and combinations thereof, and photolytically activated curing agents. Room temperature curing agents and heat-activated curing agents can include, for example, blends of epoxy homopolymerization type curing agents and addition type curing agents. The curing agents preferably react at temperatures of between about room temperature and about 200° C., more preferably about room temperature and 150° C., even more preferably between about room temperature and about 115° C. If the curing agents are used in epoxy resins that are used to make prepregs to make composite articles, then the curing agents preferably react at temperatures in the range of about 200° F. (93° C.) to about 450° F. (230° C.).

The surfacing construction may comprise any suitable curable layer, including in some embodiments those disclosed in U.S. patent application Ser. No. 11/059,834, filed Feb. 17, 2005, or U.S. Provisional Pat. App. No. 61/118,242, filed Nov. 26, 2008, the disclosures of which are incorporated herein by reference. Such layers may include: 3M™ Scotch-Weld™ Structural Adhesive Film AF163-2, 3M™ Scotch-Weld™ Structural Adhesive Film AF163-2LS, 3M™ Scotch-Weld™ Structural Adhesive Film AF163-2XS, 3M™ Scotch-Weld™ Structural Adhesive Film AF191, 3M™ Scotch-Weld™ Structural Adhesive Film AF191XS, 3M™ Scotch-Weld™ Low Density Composite Surfacing Film AF 325LS, 3M™ Scotch-Weld™ Low Density Composite Surfacing Film AF 325, Cytec FM 300LS, Cytec 1515-3LS, Henkel PL 793LS, Henkel Synskin™, Cytec Surface Master™ 905, Cytec Surface Master™ 905LS, and layers having similar composition.

In some embodiments, the curable adhesive is not a pressure sensitive adhesive.

In some embodiments, the curable adhesive is a high temperature cure adhesive. In some embodiments, a high temperature cure adhesive is one which cures in less than 6 hours at a temperature of greater than T and fails to cure in 48 hours at a temperature of less than t, where T is in some embodiments 80° C., in some embodiments 100° C., in some embodiments 120° C., and in some embodiments 180° C., and where t is in some embodiments 25° C., in some embodiments 35° C., and in some embodiments 50° C. In some embodiments, a high temperature cure adhesive is one having temperature-dependent cure characteristics similar to those of composite matrix resins typically cured at >80° C., in some embodiments similar to within 10% change in temperature, in some embodiments similar to within 20% change in temperature, and in some embodiments similar to within 30% change in temperature.

In some embodiments, the curable layer includes a curative or curing agent. Any suitable curative agent may be used. In some embodiments, the curative agent may include dicyandiamide. In some embodiments, the curative agent is dicyandiamide. In some embodiments, the curative agent may exclude amine curatives. Commercially available examples of curable adhesives which includes dicyandiamide curative include 3M™ Scotch-Weld™ Structural Adhesive Film AF 555 and 3M™ Scotch-Weld™ Structural Adhesive Film AF 191.

Barrier Layer

The surfacing construction may comprise any suitable polymeric barrier layer, including in some embodiments partially or fully cured layers of the curable layers described above. In some embodiments, the polymeric barrier layer may be selected from polyurethanes, polyureas, polyesters, polyimides, polybutadienes, elastomers, epoxies, fluoropolymers, polycarbonates, mixtures of the above. In some embodiments the polymeric barrier layer is the same polymer as the curable layer. In some embodiments the polymeric barrier layer is a different polymer from the curable layer. In some embodiments the polymeric barrier layer includes a crosslinked polymer.

Any suitable barrier layer may be used. In some embodiments, the polymeric barrier layer may be selected from polyurethanes, polyureas, polyesters, polyimides, polybutadienes, elastomers, epoxies, fluoropolymers, polycarbonates, mixtures of the above. Typically the polymeric barrier layer is of a material that can be used to manufacture parts that are cured or formed under vacuum and/or pressure at temperatures from 20° C. to 180° C. without excessive flow or loss of integrity. In some embodiments the polymeric barrier layer is fully cured. In some embodiments the polymeric barrier layer is partially cured, typically at least 50% cured, more typically at least 60% cured, more typically at least 70% cured, more typically at least 80% cured, and more typically at least 90% cured. In some embodiments the polymeric barrier layer is thermoplastic. Each barrier layer typically has a thickness of less than 10 mil, more typically less than 6 mil, more typically less than 4 mil, more typically less than 3 mil, more typically less 2 mil, more typically less than 1 mil, in some embodiments less than 0.75 mil, in some embodiments less than 0.60 mil, in some embodiments less than 0.50 mil, in some embodiments less than 0.25 mil, in some embodiments less than 0.10 mil, in some embodiments less than 0.05 mil, and in some embodiments less than 0.01 mil. Each barrier layer typically has a thickness of at least 0.001 mil. Typically the barrier layer is substantially impermeable to gasses. More typically the barrier layer remains substantially impermeable to gasses throughout the process of manufacturing a composite of which it is a part. In some embodiments, substantially impermeable to gasses means having an oxygen permeability of less than 35 $cm^3$-mm/$m^2$/day/atm. Typically the barrier layer is substantially impermeable to moisture. More typically the barrier layer remains substantially impermeable to moisture throughout the process of manufacturing a composite of which it is a part. In some embodiments, substantially impermeable to moisture means having a moisture vapor transmission rate of less than 30 gm/$m^2$/day. Typically the barrier layer is substantially impermeable to organic solvents. More typically the barrier layer remains substantially impermeable to organic solvents throughout the process of manufacturing a composite of which it is a part. In some embodiments, such organic solvents may include fuels, aircraft fuels, lubricants, hydraulic fluids, and the like. In some embodiments, substantially impermeable to an organic solvent means exhibiting less than 10% weight gain or loss after 7 days exposure to the solvent at 21° C. and 1 atmosphere. In some embodiments, substantially impermeable to organic solvents means exhibiting less than 10% weight gain or loss after 7 days exposure to methylene chloride at 21° C. and 1 atmosphere. In some embodiments, substantially impermeable to organic solvents means exhibiting less than 10% weight gain or loss after 7 days exposure to benzyl alcohol at 21° C. and 1 atmosphere. In some embodiments, substantially impermeable to organic solvents means exhibiting less than 10% weight gain or loss after 7 days exposure to gasoline at 21° C. and 1 atmosphere. In some embodiments, the barrier layer is electrically non-conductive. More typically the barrier layer remains electrically non-conductive throughout the process of manufacturing a composite of which it is a part. The barrier layer optionally includes flame retardant ingredients or additives.

In some embodiments, barrier layers may comprise materials such as polyethylene, polyurethane, polycarbonate and polyimide films including Kapton™ available from DuPont Films, Buffalo, N.Y. The barrier layers may be clear and colorless, or include a colorant, such as a pigment or dye as the application requires. The barrier layer may be alloys of these materials and optionally include flame retardant ingredients or other additives, such as a polyurethane/polycarbonate blend resin with UV absorbers available as U933 from Alberdingk Boley GmbH., Krefeld, Germany.

In some embodiments, barrier layers may comprise materials such as fluorinated polymers. In some embodiments, barrier layers may comprise perfluorinated fluoropolymers, which may include FEP, PFA or PTFE polymers, including those available from Dyneon. In some embodiments, barrier layers may comprise non-perfluorinated fluoropolymers, such as polymer which may include interpolymerized units derived from vinylidene fluoride (VDF). Such materials typically include at least about 3 weight percent of interpolymerized units derived from VDF, which may be homopolymers or copolymers with other ethylenically unsaturated monomers, such as hexafluoropropylene (HFP), tetrafluoroethylene (TFE), chlorotrifluoroethylene (CTFE), 2-chloropentafluoropropene, perfluoroalkyl vinylethers, perfluorodiallylether, perfluoro-1,3-butadiene, and/or other perhalogenated monomers and further derived from one or more hydrogen-containing and/or non-fluorinated olefinically unsaturated monomers. Such fluorine-containing monomers may also be copolymerized with fluorine-free terminally unsaturated olefinic comonomers, such as ethylene or propylene. Useful olefinically unsaturated monomers may include alkylene monomers such as 1-hydropentafluoropropene, 2-hydropentafluoropropene, etc. Such fluoropolymers may include tetrafluoroethylene-hexafluoropropylene-vinylidene fluoride terpolymers and hexafluoropropylene-vinylidene fluoride copolymers. Commercially available fluoropolymer materials which may be useful may include, for example, THV 200, THV 400, and THV 500 fluoropolymers, which are available from Dyneon LLC of Oakdale, Minn., and SOLEF 11010 and SOLEF 11008, which are available from Solvay Polymers Inc., Houston, Tex., KYNAR® and KYNAR FLEX® PVDF which are available from Arkema Inc., Philadelphia, Pa., and TEFZEL LZ300 fluoropolymers, which are available from DuPont Films, Buffalo, N.Y. Additional commercially available fluoroelastomer materials of this type include, for example, FC-2145, FC-2178, FC-2210X, FC-2211, FC-2230 which are available from Dyneon LLC of Oakdale, Minn., and Technoflon® fluoroelastomers which are available from Solvay Polymers Inc., Houston, Tex. Other useful fluorinated polymers, may include non-perfluorinated polymers, which may include poly(vinylfluoride), such as TEDLAR TAW15AHS, which is available from DuPont Films of Buffalo, N.Y. Blends of fluoropolymers can also be used to make the barrier layers of the present disclosure. Commercially available fluoropolymer materials of this type include, for example, polyvinylidene fluoride alloy films available as DX Film from Denki Kagaku Kogyo Kabushiki Kaisha, Tokyo, JAPAN. Blends of two different types of non-perfluorinated fluoropolymers may be useful, as well as blends of a non-perfluorinated fluoropolymer with a perfluorinated fluoropolymer. Furthermore, blends of fluoropolymers with nonfluoropolymers, such as polyurethane and polyethylene, for example, can also be used.

Barrier layers for use in the present disclosure can be made by any suitable method, which may include cast and extrusion methods.

In some embodiments, barrier layers may be clear and colorless, or may include a colorant, such as a pigment or dye as the application desires. Typically, the colorant is an inorganic pigment, such as those disclosed in U.S. Pat. No. 5,132,164. In some embodiments, the pigment may be incorporated into one or more nonfluorinated polymers, which can be blended with one or more fluorinated polymers. In some embodiments, the barrier layers may be finish and/or color-matched to existing appliqué or paint color schemes.

Optionally, at least one of the surfaces may be treated to allow for bonding of adjacent layers. Such treatment methods include corona treatment, particularly corona discharge in an atmosphere containing nitrogen, and about 0.1 to about 10 volume percent of an additive gas selected from the group consisting of hydrogen, ammonia, and mixtures thereof, as disclosed in U.S. Pat. No. 5,972,176 (Kirk et al.). Another useful treatment method includes a chemical etch using sodium naphthalenide. Such treatment methods are disclosed in Polymer Interface and Adhesion, Souheng Wu, Ed., Marcel Dekker, Inc., NY and Basel, pp. 279-336 (1982), and Encyclopedia of Polymer Science and Engineering, Second Edition, Supplemental Volume, John Wiley & Sons, pp. 674-689 (1989). Another useful treatment method is the FLUOROETCH process, available from Acton Industries, Inc., Pittston, Pa. Other useful treatments for surface modification of fluoropolymers include methods that expose a light absorbing electron donor to actinic radiation in the presence of a fluoropolymer such as those disclosed in U.S. Pat. No. 6,630,047 (Jing et al.) and U.S. Pat. No. 6,685,793 (Jing). Other treatment methods include the use of such materials as primers. These may be employed either in place of, or in addition to the surface treatments described above. An example of a useful primer is ADHESION PROMOTER #86A (a liquid primer, available from Minnesota Mining and Manufacturing Company, St. Paul, Minn.).

Surfacing Construction

A surfacing construction according to the present disclosure may be made by any suitable method. Typically, one or more curable layers and one or more barrier layers are joined by any suitable method, including lamination, adhesive bonding by addition of an adhesive layer, adhesive bonding by the adhesive properties of the barrier or curable layer(s) themselves, or the like. Typically, the layers of the surfacing construction are joined prior to use in manufacture of a composite article, however, in some embodiments the layers become joined during manufacture of a composite article. In some embodiments, a single material may perform as both barrier layer and curable layer. Some such embodiments may comprise a single layer of material. In some embodiments, barrier layer(s) and curable layer(s) are different materials.

In some embodiments, the surfacing construction (surfacing film) may comprise a single polymeric barrier layer and a single curable layer. In some embodiments, the surfacing construction may comprise multiple alternating barrier layers and curable layers. In some embodiments, the surfacing construction may comprise more than one polymeric barrier layer. In some embodiments, the surfacing construction may comprise more than one curable layer. In some embodiments, a curable layer of the surfacing construction is adjacent to the composite in the manufacture of a composite part comprising the surfacing construction. In some embodiments, a curable layer of the surfacing construction is immediately adjacent to the composite in the manufacture of a composite part comprising the surfacing construction.

In some embodiments, the surfacing construction may additionally comprise one or more electrically conductive layers, typically metal layers, which may optionally be a foil, expanded foil, mesh, cloth, paper, wires, or the like. In some embodiments, the electrically conductive layer or layers are sandwiched between barrier layers. In some embodiments, the electrically conductive layer or layers are contained within barrier layers. In some embodiments the electrically conductive layer or layers are adjacent to the barrier layer. In some embodiments the electrically conductive layer or layers are immediately adjacent to the barrier layer.

In some embodiments, the surfacing construction may additionally comprise one or more layers of functional materials such as radiation absorbing materials, EMI blocking materials, radiation reflecting materials or viscoelastic layers. Such materials may include materials disclosed in U.S. patent application Ser. No. 12/255,025, filed on Oct. 21, 2008, based on priority application 60/983,781 filed, Oct. 30, 2007, the disclosure of which is incorporated herein by reference. Such materials may include 3M™ Transparent Electrically Conductive Adhesive Films (3M Company, St. Paul, Minn.). Viscoelastic materials which may be useful may include those disclosed in U.S. Pat. Pub. No. 2008/0139722, U.S. patent application Ser. No. 11/952,192, filed Dec. 7, 2007, the disclosure of which is incorporated herein by reference. Viscoelastic materials and viscoelastic constructions which may be included in the surfacing construction may include those described in U.S. patent application Ser. No. 12/637,915, filed on even date herewith, the disclosure of which is incorporated herein by reference. Materials which may be useful may include 3M™ Viscoelastic Damping Polymers Type 830 (3M Company, St. Paul, Minn., USA).

In some embodiments, the functional layer or layers are sandwiched between barrier layers. In some embodiments, the functional layer or layers are contained within one or more barrier layers. In some embodiments, the functional layer or layers are adjacent to one or more barrier layers. In some embodiments, the functional layer or layers are immediately adjacent to one or more barrier layers.

In some embodiments, the surfacing construction does not comprise filler materials. In some embodiments, the surfacing construction does not comprise inorganic filler materials. In some embodiments, the surfacing construction does not comprise organic filler materials. In some embodiments, the surfacing construction does not comprise fibrous filler materials. In some embodiments, the surfacing construction does not comprise non-fibrous filler materials. In some embodiments, the surfacing construction does not comprise particulate filler materials. In some embodiments, the surfacing construction does not comprise any fibrous scrim, such as a woven scrim or a non-woven scrim. In some embodiments, the composite part does not comprise a surface fibrous scrim, such as a woven scrim or a non-woven scrim. In some embodiments, the composite part does not comprise an electrically conductive or static dissipating coating such as a paint.

Composite Article

A composite article according to the present disclosure may be made by any suitable method. Typically, curable fiber reinforced resin matrix prepregs are used, however, in other embodiments resin matrix and fiber reinforcement may be combined in manufacture of the composite article. Any suitable fiber or matrix materials may be used, many of which are known in the art. Typically, a mold or form designated a tool is used, the tool having a shape which is the inverse of the desired shape of the laminate. Typically the surfacing construction is laid up in the tool, or components thereof, followed by one or more curable fiber reinforced resin matrixes and, in some embodiments, core layer(s) such as foam, wood, or honeycomb construction core layer(s). Thereafter the lay-up is cured by methods known in the art.

In some embodiments, the composite article additionally comprises at least one core layer. In some embodiments, the core layer may comprise foam, wood, or honeycomb construction. Such core layers may be laid up between curable fiber reinforced resin matrix layers in the manufacture of a composite article. In some embodiments, the layered article comprises no such a core layer.

Objects and advantages of this disclosure are further illustrated by the following examples, but the particular materials and amounts thereof recited in these examples, as well as other conditions and details, should not be construed to unduly limit this disclosure.

Examples

Unless otherwise noted, all reagents were obtained or are available from Aldrich Chemical Co., Milwaukee, Wis., or may be synthesized by known methods.

Methods

General Tooling and Bagging of a Composite Part

A composite specimen with a curable epoxy adhesive resin was prepared for curing in the following manner. A flat tool was fabricated by trimming to 2 ft×2 ft a 12 gauge stainless steel alloy 304 with 2B finish. A 1 mil PTFE non-perforated parting film (available as HTF-621 from Northern Fiber Glass Sales, Inc.) was applied to the tool and affixed thereon with heat resistant tape applied at the edges and corners of the film. Each layer of material was applied to the tool in the order and arrangement described in the example text. Each layer was applied first to the tool, then one upon the other without liners by hand and each layer was consolidated with the previous layer(s) by passing a 1.5 inch diameter wooden roller over the upper-most layer while applying hand pressure to the roller. After every forth ply, the part and tool were covered with a layer of perforated parting film described below and then a layer of breather ply described below and the part was compacted to the tool under full vacuum in a Scotchlite Vacuum Applicator Model VAL-1 manufactured by 3M for 3 minutes after which time the breather ply and perforated parting film were removed and additional plies were added to the part. Each coupon was permanent marked by applying a unique identifier along one edge of the part on the exposed face of the part using a Pilot Silver Marker. A perforated parting film available as A5000 from Richmond Aircraft Products was applied wrinkle-free so as to completely cover the exposed face of the coupon. 1 thermocouple was attached to the tool within 2 inches of the coupon. A layer of non-perforated parting film was applied to the bed of the autoclave described below to cover the area where the tools were placed. The tool and part were placed on the bed of the autoclave described below and a continuous bead of vacuum bag sealing tape was applied directly to the bed of the autoclave so that the distance from the tape to the tool was at least 3 inches. The exposed non-perforated parting film on the bed of the autoclave was folded or trimmed clear of the vacuum bag sealing tape. A non-woven polyester 10 oz/yd$^2$ felt breather ply (available as RC-3000-10 from Richmond Aircraft Products) was overlaid upon the part and the tool and onto the bed of the autoclave such that it extended to within 2 inches of the vacuum bag sealing tape on all sides. A 3 mil high temperature nylon bagging film (available as HS8171 from Richmond Aircraft Products) was placed loosely over the bed of the autoclave to cover the part and tools and to extend to or beyond the vacuum bag sealing tape on all sides. At least 1 vacuum port assembly was installed in the vacuum bag over the breather ply and the vacuum bag was sealed to the bed of the autoclave along all edges by pressing the film against the vacuum bag seal tape.

High Pressure Curing of a Composite Part

A composite specimen with a curable epoxy adhesive resin was cured in the following manner. Each composite specimen with a curable epoxy adhesive resin was prepared for curing according to "General Tooling and Bagging of a Composite Part". The vacuum port assembly(ies) was attached to the vacuum system in the autoclave described below and the parts, tools, parting films and breather plies were consolidated under full vacuum for 5 minutes. The thermocouples were attached to the control system in the autoclave. The part was then cured under controlled temperature and pressure conditions in one of two autoclaves, one made by Thermal Equipment Corporation or the other made by ASC Process Systems, using pressure and temperature profiles described below. The pressure inside the autoclave was increased to 60 psi and the vacuum to the vacuum port assemblies was removed when the pressure in the autoclave reached 15 psi and the temperature was increased at 5° F./minute until the temperature of the lagging thermocouple reached 177° C. The pressure was maintained between 60 psi and 70 psi and the temperature was maintained between 177° C. and 182° C. for 120 minutes. The temperature was reduced at a controlled rate of 5° F./minute until the temperature of the lagging thermocouple reached 44° C. The pressure was maintained between 60 psi and 70 psi until the temperature of the lagging thermocouple reached 66° C., then the pressure in the autoclave was vented to the atmosphere. The cured composite specimen was removed from the autoclave, bagging and tool.

Low Pressure 1½ Hour Curing of a Composite Part

A composite specimen with a curable epoxy adhesive resin was cured in the following manner. Each composite specimen with a curable epoxy adhesive resin was prepared for curing according to "General Tooling and Bagging of a Composite Part". The vacuum port assembly(ies) was attached to the vacuum system in the autoclave described below and the parts, tools, parting films and breather plies were consolidated under full vacuum for 5 minutes. The thermocouples were attached to the control system in the autoclave. The part was then cured under controlled temperature and pressure conditions in one of two autoclaves, one made by Thermal Equipment Corporation or the other made by ASC Process Systems, using pressure and temperature profiles described below. The pressure inside the autoclave was increased to 45 psi and the vacuum to the vacuum port assemblies was removed when the pressure in the autoclave reached 15 psi and the temperature was increased at 5° F./minute until the temperature of the lagging thermocouple reached 177° C. The pressure was maintained between 40 psi and 50 psi and the temperature was maintained between 177° C. and 182° C. for 90 minutes. The temperature was reduced at a controlled rate of 5° F./minute until the temperature of the lagging thermocouple reached 44° C. The pressure was maintained between 40 psi and 50 psi until the temperature of the lagging thermocouple reached 66° C., then the pressure in the autoclave was vented to the atmosphere. The cured composite specimen was removed from the autoclave, bagging and tool.

Low Pressure 2 Hour Curing of a Composite Part

A composite specimen with a curable epoxy adhesive resin was cured in the following manner. Each composite specimen with a curable epoxy adhesive resin was prepared for curing according to "General Tooling and Bagging of a Composite Part". The vacuum port assembly(ies) was attached to the vacuum system in the autoclave described below and the parts, tools, parting films and breather plies were consolidated under full vacuum for 5 minutes. The thermocouples were attached to the control system in the autoclave. The part was then cured under controlled temperature and pressure conditions in one of two autoclaves, one made by Thermal Equipment Corporation or the other made by ASC Process Systems, using pressure and temperature profiles described below. The pressure inside the autoclave was increased to 45 psi and the vacuum to the vacuum port assemblies was removed when the pressure in the autoclave reached 15 psi and the temperature was increased at 5° F./minute until the temperature of the lagging thermocouple reached 177° C. The pressure was maintained between 40 psi and 50 psi and the temperature was maintained between 177° C. and 182° C. for 120 minutes. The temperature was reduced at a controlled rate of 5° F./minute until the temperature of the lagging thermocouple reached 44° C. The pressure was maintained between 40 psi and 50 psi until the temperature of the lagging thermocouple reached 66° C., then the pressure in the autoclave was vented to the atmosphere. The cured composite specimen was removed from the autoclave, bagging and tool.

General Laminating

Layers in the construction were brought together in combinations, order and quantities as described below. Removable carriers were separated from mating surfaces during the laminating process. These layers were laminated by feeding them at a rate of 2.5 ft/min into the nip of a Geppert Engineering Inc. laminator using 4 inch rubber rollers a ambient conditions (22° C.; 50 percent Relative Humidity).

Intermediate Assembly Examples:

Polyurethane/Polycarbonate Barrier Layer, 200

A polyurethane/polycarbonate barrier layer was provided in the following manner. A polymer solution was prepared. More specifically, 100 parts of transparent polyurethane/polycarbonate resin with 3% UV Absorber available as U933 from Alberdingk, and 1.5 parts polyfunctional aziridine crosslinker available as Neocryl CX-100 from Neoresins Inc. were added to a one liter, narrow-mouthed bottle. The solution was mixed by stirring with a wooden tongue depressor for 3 minutes at ambient conditions (22° C.; 50 percent Relative Humidity). The final polymer solution was then poured onto the surface of an untreated 2 mil transparent polyester film, and coated using a knife-over-bed coating station. The gap between knife and bed was set to be 1.5 mils greater than the thickness of the polyester carrier web. The coated backing was dried at 55° C. for 1 hour in a 9 ft³ vented recirculating oven manufactured by the Dispatch Oven Company. After drying, the thickness of the polyurethane/polycarbonate film was approximately 0.5 mil. A transparent UV absorbing polyurethane/polycarbonate film borne on polyester film was obtained.

Fluoropolymer Barrier Layer, 208

Several fluoropolymer films were provided or cast at approximately 1 mil thickness and used to make examples. These films included:

Dyneon™ Fluorothermoplastic THV500 from Dyneon™

Dyneon™ Fluoroplastic PVDF 11010/0000 polyvinylidene fluoride from Dyneon™

Dyneon™ Fluoroplastic PVDF 11008/0001 polyvinylidene fluoride from Dyneon™

Solef® 11010 polyvinylidene fluoride from Solvay Solexis.

Dyneon™ Fluoroplastic PVDF 11010/0000 polyvinylidene fluoride from Dyneon™ combined with Polymethyl Methacrylate (PMMA), available broadly, at 90/10, 80/20, 75/25, 60/40, and 50/50% by weight.

Conductive Fluoropolymer Barrier Layer, 513

Several fluoropolymer films were provided or cast with conductive additives to approximately 1 mil thickness and used to make examples. These films included:

Dyneon™ Fluorothermoplastic THV510ESD from Dyneon™

Dyneon™ Fluorothermoplastic THV500 from Dyneon™ combined with Baytubes® C150HP multiwalled carbon nano-tubes from Bayer at 98/2% by weight.

Dyneon™ Fluoroplastic PVDF 11010/0000 polyvinylidene fluoride from Dyneon™ combined with Baytubes® C150HP multiwalled carbon nano-tubes from Bayer at 98/2, and 99.25/0.25% by weight.

Viscoelastic Construction With a Barrier Layer Each Side of Viscoelastic Material (VEM) Layer, 10

Figure 8:
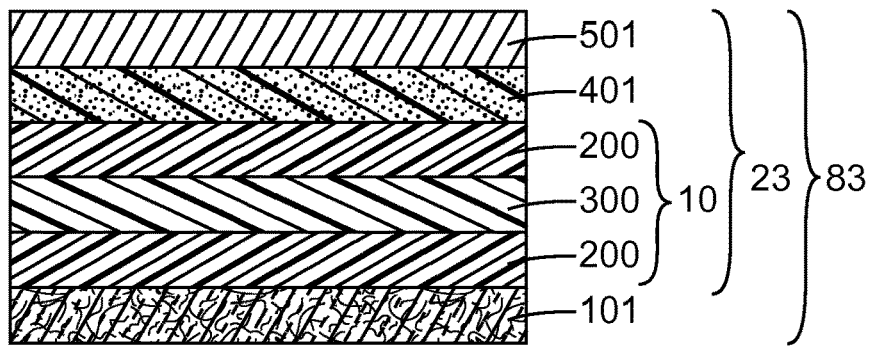
FIG. 8 is schematic depiction of a fiber reinforced resin matrix composite laminate including a surfacing construction according to the present disclosure, as described in the Examples below.

With reference to the FIG. 8, a viscoelastic material 300 and a polyurethane/polycarbonate barrier layer 200 were provided and used to prepare a modified viscoelastic construction 10, such as described more generally in U.S. patent application Ser. No. 12/637,915, filed on even date herewith, the disclosure of which is incorporated herein by reference. More specifically, the following materials were assembled and laminated as described in "General Laminating" above. First, a ½ mil thick polyurethane/polycarbonate barrier layer 200 per "Polyurethane/Polycarbonate Barrier Layer" above, borne on a polyester film (not shown) was joined to one side of a 2 mil thick viscoelastic damping polymer 300, available as 3M™ Viscoelastic Damping Polymers Type 830 from 3M Company, which has a peak damping ratio (Tan δ) of greater than 1.0 as measured in shear mode by DMTA at 10 Hz. To the other side of the 2 mils viscoelastic damping polymer 300 was joined another ½ mil thick polyurethane/polycarbonate barrier layer 200 per "Polyurethane/Polycarbonate Barrier Layer" above. All remaining liners and carriers were removed, including polyester films, providing a 3 mil thick modified viscoelastic construction 10. The character of the viscous-elastic material 300 was to be easily torn by hand, unable to support itself in a free-standing state, and very tacky at ambient conditions (22° C.; 50 percent Relative Humidity). The character of the modified viscoelastic construction 10 was to be very elastic, film-like in the free standing state, and lacking tack at ambient conditions (22° C.; 50 percent Relative Humidity). A non-tacky, stiffened, viscoelastic construction was obtained.

Barrier Modified Surfacing Film 20

Figure 3:
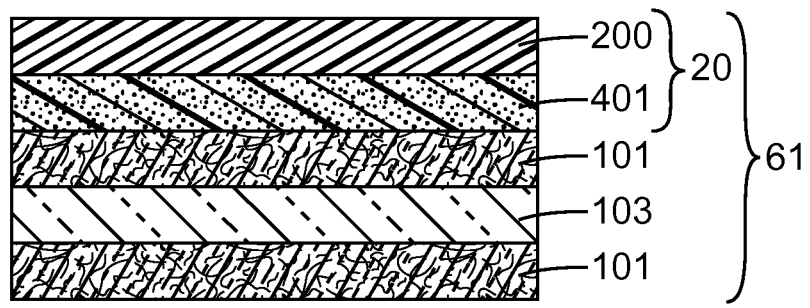
FIG. 3 is schematic depiction of a fiber reinforced resin matrix composite laminate including a surfacing construction according to the present disclosure, as described in the Examples below.

With reference to the FIG. 3, structural adhesive film 401 and polyurethane/polycarbonate barrier layer 200 were provided and used to prepare barrier modified surfacing film 20. More specifically, the following materials were assembled and laminated as described in "General Laminating" above. A ½ mil thick polyurethane/polycarbonate barrier layer 200 prepared as described above was joined to one side of an 8 mil thick epoxy structural adhesive film 401 which includes a non-woven polyester veil at 0.05 lbs./sqft available as 3M™ Scotch-Weld™ Structural Adhesive Film AF 555M from 3M Company. Remaining liners and carriers were removed, including polyester films, providing an 8.5 mil thick barrier modified surfacing film 20, which is a UV blocking surfacing film with a high temperature structural adhesive film and a thinner cured barrier layer.

Barrier Modified Surfacing Film 24

Figure 4:
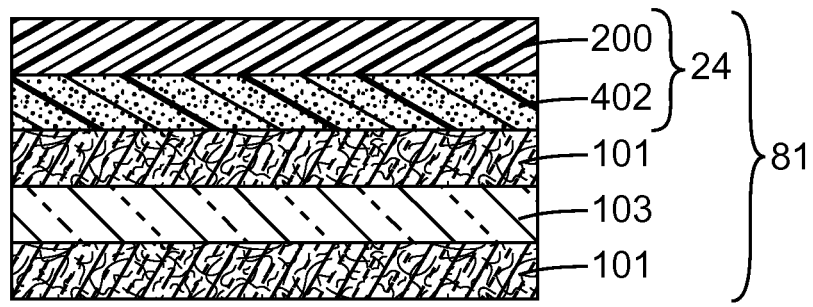
FIG. 4 is schematic depiction of a fiber reinforced resin matrix composite laminate including a surfacing construction according to the present disclosure, as described in the Examples below.

With reference to FIG. 4, structural adhesive film 402 and polyurethane/polycarbonate barrier layer 200 were provided and used to prepare barrier modified surfacing film 24. More specifically, the following materials were assembled and laminated as described in "General Laminating" above. A ½ mil thick polyurethane/polycarbonate barrier layer 200 prepared as described above was joined to one side of a 13 mil thick epoxy structural adhesive film 402 which includes a knit nylon veil at 0.085 lbs./sqft available as 3M™ Scotch-Weld™ Structural Adhesive Film AF 500K from 3M Company. Remaining liners and carriers were removed, including polyester films, providing a 13.5 mil thick barrier modified surfacing film 24, which is a transparent UV blocking surfacing film with a low temperature structural adhesive film and a thinner cured barrier layer.

Barrier Modified Surfacing Film 25

Figure 13:
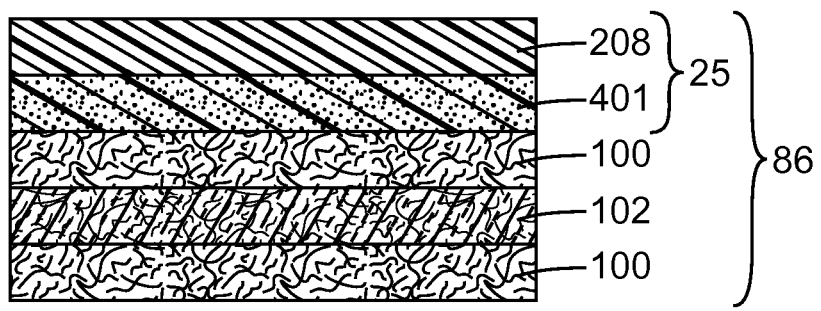
FIG. 13 is schematic depiction of a fiber reinforced resin matrix composite laminate including a surfacing construction according to the present disclosure, as described in the Examples below.

With reference to FIG. 13, structural adhesive film 401 and fluoropolymer barrier layer 208 were provided and used to prepare a barrier modified surfacing film 25. More specifically, the following materials were assembled and laminated as described in "General Laminating" above. A 1 mil thick film of fluoropolymer film 208 was joined to one side of an 8 mil thick epoxy structural adhesive film 401 which includes a non-woven polyester veil at 0.05 lbs./sqft available as 3M™ Scotch-Weld™ Structural Adhesive Film AF 555M from 3M Company. Each of the fluoropolymer films listed above was used to create a separate specimen. All remaining liners and carriers were removed, including polyester films, providing a 9 mil thick barrier modified surfacing film 25, which is a UV stable, fluid resistant surfacing film with a structural adhesive film and a thinner, cured fluoropolymer barrier layer.

Multi-Layered Barrier Modified Surfacing Film 21

Figure 5:
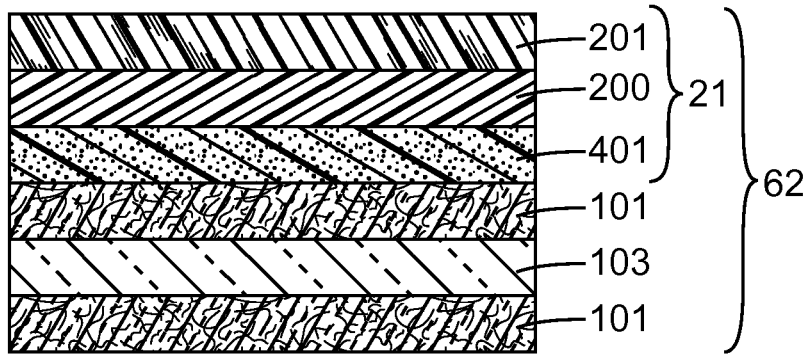
FIG. 5 is schematic depiction of a fiber reinforced resin matrix composite laminate including a surfacing construction according to the present disclosure, as described in the Examples below.

With reference to FIG. 5, a structural adhesive film 401 and a polyurethane/polycarbonate barrier layer 200 with attached 2 mil transparent polyester film 201 were provided and used to prepare multi-layered barrier modified surfacing film 21. More specifically, the following materials were assembled and laminated as described in "General Laminating" above. A ½ mil thick polyurethane/polycarbonate barrier layer 200 with attached 2 mil transparent polyester film 201 per "Polyurethane/Polycarbonate Barrier Layer" above was joined to one side of an 8 mil thick epoxy structural adhesive film 401 which includes a non-woven polyester veil at 0.05 lbs./sqft available as 3M™ Scotch-Weld™ Structural Adhesive Film AF 555M from 3M Company. All liners and carriers except the 2 mil transparent polyester film 201 attached to polyurethane/polycarbonate barrier layer 200 were removed, providing a 10.5 mil thick multi-layered barrier modified surfacing film 21, which is a glossy UV blocking surfacing film with a high temperature structural adhesive film and thinner cured barrier layers.

Multi-Layered Barrier Modified Surfacing Film 26

Figure 6:
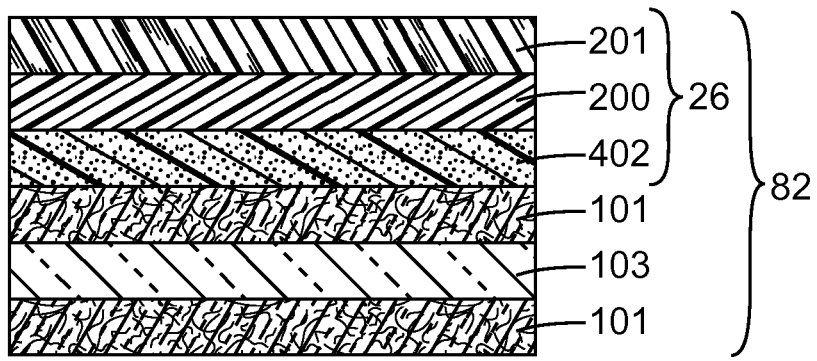
FIG. 6 is schematic depiction of a fiber reinforced resin matrix composite laminate including a surfacing construction according to the present disclosure, as described in the Examples below.

With reference to FIG. 6, a structural adhesive film 402 and a polyurethane/polycarbonate barrier layer 200 with attached 2 mil transparent polyester film 201 were provided and used to prepare a multi-layered barrier modified surfacing film 26. More specifically, the following materials were assembled and laminated as described in "General Laminating" above. A ½ mil thick polyurethane/polycarbonate barrier layer 200 with attached 2 mil transparent polyester film 201 per "Polyurethane/Polycarbonate Barrier Layer" above was joined to one side of a 13 mil thick epoxy structural adhesive film 402 which includes a knit nylon veil at 0.085 lbs./sqft available as 3M™ Scotch-Weld™ Structural Adhesive Film AF 500K from 3M Company. All liners and carriers except the 2 mil transparent polyester film 201 attached to polyurethane/polycarbonate barrier layer 200 were removed, providing a 15.5 mil thick multi-layered barrier modified surfacing film (26). A glossy transparent UV blocking surfacing film was obtained with a low temperature structural adhesive film and thinner cured barrier layers.

Multi-Layered Barrier Modified Conductive Surfacing Film 22

Figure 7:
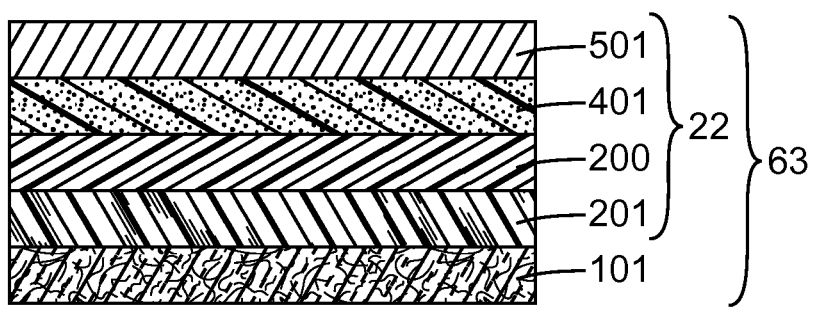
FIG. 7 is schematic depiction of a fiber reinforced resin matrix composite laminate including a surfacing construction according to the present disclosure, as described in the Examples below.

With reference to the FIG. 7, structural adhesive film 401, expanded aluminum foil 501 and polyurethane/polycarbonate barrier layer 200 with attached 2 mil transparent polyester film 201 were provided and used to prepare a multi-layered barrier modified conductive surfacing film 22. More specifically, the following materials were assembled and laminated as described in "General Laminating" above. First a ½ mil thick polyurethane/polycarbonate barrier layer 200 with attached 2 mil transparent polyester film 201 per "Polyurethane/Polycarbonate Barrier Layer" above was joined to one side of an 8 mil thick epoxy structural adhesive film 401 which includes a non-woven polyester veil at 0.05 lbs./sqft available as 3M™ Scotch-Weld™ Structural Adhesive Film AF 555M from 3M Company. To the other side of the epoxy film was joined a 4 mil thick expanded aluminum foil 501 available as Exmet 4AL8-080 from Dexmet. All liners and carriers except 2 mil transparent polyester film 201 attached to the polyurethane/polycarbonate barrier layer 200 were removed, providing a 14.5 mil thick multi-layered barrier modified conductive surfacing film 22, which is a UV blocking conductive surfacing film with a high temperature structural adhesive film, expanded metal foil and thinner, cured barrier layers.

Multi-Layered Barrier Modified Conductive Surfacing Film With Viscoelastic Construction 23

With reference to FIG. 8, structural adhesive film 401 and expanded aluminum foil 501 and modified viscoelastic construction 10 were provided and used to prepare modified viscoelastic conductive surfacing film 23. More specifically, the following materials were assembled and laminated as described in "General Laminating" above. First a 3 mil thick modified viscoelastic construction 10 having barrier layers either side of a viscoelastic material was joined to one side of an 8 mil thick epoxy film 401 which includes a non-woven polyester veil at 0.05 lbs./sqft available as 3M™ Scotch-Weld™ Structural Adhesive Film AF 555M from 3M Company. To the other side of structural adhesive film 401 was joined a 4 mil thick expanded aluminum foil 501 available as Exmet 4AL8-080 from Dexmet. All liners and carriers except a 2 mil transparent polyester film (not shown) attached to barrier layer 200 were removed, providing a 15 mil thick modified visco-elastic conductive surfacing film 23 borne on 2 mil transparent polyester film (not shown). The UV blocking conductive vibration damping surfacing film was obtained with a high temperature structural adhesive film and expanded metal foil and visco-elastic vibration damping material and thinner cured barrier layers.

Multi-Layered Transparent EMI Shield Surfacing Film With Electromagnetic Interference (EMI) Shield of Alternating Functional Layers and Barrier Layers, 30

Figure 9:
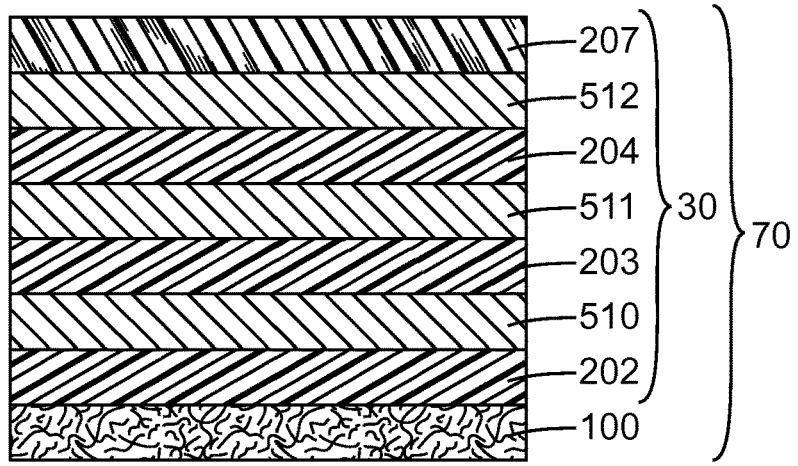
FIG. 9 is schematic depiction of a fiber reinforced resin matrix composite laminate including a surfacing construction according to the present disclosure, as described in the Examples below.
Figure 10:
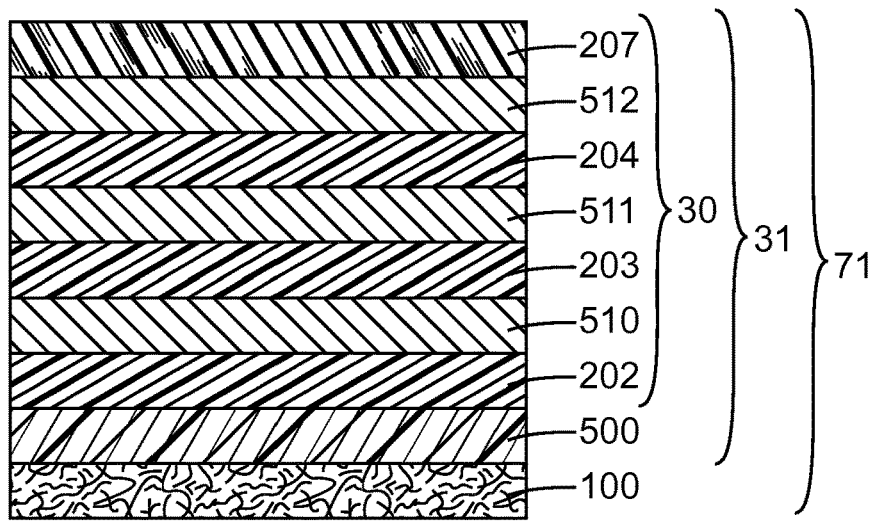
FIG. 10 is schematic depiction of a fiber reinforced resin matrix composite laminate including a surfacing construction according to the present disclosure, as described in the Examples below.

With reference to FIGS. 9 and 10, a 4 mil multi-layered transparent EMI shield surfacing film 30 was prepared as disclosed in U.S. patent application Ser. No. 12/255,025, filed on Oct. 30, 2007, based on priority application 60/983,781 filed Oct. 21, 2008, the disclosure of which is incorporated herein by reference. The film includes alternating 15 nm thick layers of silver 510, 511, 512 and 70 nm thick layers of acrylic barrier film 202, 203, 204 vapor deposited in a vacuum chamber onto a 4 mil transparent polyester film 207. This film provides high visual transparency, substantially absorbs and reflects infrared wavelengths above 800 nm and ultraviolet wavelengths below 400 nm, and provides approximately 44 dB of EMI shielding effectiveness at 100-1000 MHz.

Conductive Multi-Layered Transparent EMI Shield Surfacing Film 31

With reference to FIG. 10, a multi-layered transparent EMI shield surfacing film 30 and an epoxy surfacing film with an expanded copper foil 500 were provided and used to prepare a conductive multi-layered transparent EMI Shield surfacing film 31. More specifically, the following materials were assembled and laminated as described in "General Laminating" above. The 4 mil multi-layered transparent EMI shield surfacing film 30 was joined with an 8 mil epoxy surfacing film 500 which includes an expanded copper foil at 0.05 lbs./sqft, available as 3M™ Scotch-Weld™ Low Density Composite Surfacing Film AF 325LS from 3M Company, such that the 4 mil polyester film on the transparent EMI film was opposite the surfacing film. All liners and carriers were removed, providing a 12 mil thick conductive multi-layered transparent EMI shield surfacing film 31. The film provides high visual transparency, substantially absorbs and reflects infrared wavelengths above 800 nm and ultraviolet wavelengths below 400 nm, and provides approximately 44 dB of shielding effectiveness at 100-1000 MHz, and the conductive surfacing film provides a smooth sandable finish on the final part and conductivity for shielding and lightning protection.

Conductive Barrier Film 33

The following materials were assembled and laminated as described in "General Laminating" above: a fluoropolymer layer 209 (Dyneon™ Fluoroplastic PVDF 11010/0000 polyvinylidene fluoride from Dyneon™ cast to a film approximately 1 mil thick) was joined on one side with 0.22 mil thick aluminum foil 502 (available from Republic Foil Inc.) to make conductive barrier film 33.

Conductive Barrier Film 34

More specifically, was applied a 300 nm thick copper screen 505 was electrodeposited and patterned as hexagons 300 um on a side, using circuit board printing processes, to one side of 2 mil transparent polyester film 201 to make conductive barrier film 34.

Cured Examples:

Cured Carbon Fiber Reinforced Plastic (CFRP) Laminate With Expanded Copper Foil (ECF) and Surfacing Film, 60C (Comparative)

With reference to FIG. 1, epoxy resin impregnated carbon fiber fabric 100 and an epoxy surfacing film with an expanded copper foil 500 were provided and used to prepare comparative composite specimen 60C. More specifically, the following materials were assembled and prepared as described in "General Tooling and Bagging of a Composite Part" above. Applied first to the tool was epoxy surfacing film 500 which includes an expanded copper foil at 0.05 lbs./sqft, available as 3M™ Scotch-Weld™ Low Density Composite Surfacing Film AF 325LS from 3M Company. Lastly applied was 7 plies epoxy resin impregnated carbon fiber fabric 100, graphite fabric 3K-70-PW available as Cycom 970/PWC FT300 3K UT from Cytec. The curable resins in this assembly were cured as described in "High Pressure Curing of a Composite Part" above.

Cured Laminate With EAF and Adhesive Film, 80C (Comparative)

Figure 2:
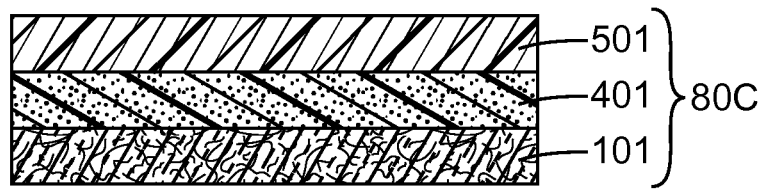
FIG. 2 is schematic depiction of a comparative composite laminate as described in the Examples below.

With reference to FIG. 2, epoxy resin impregnated glass fiber fabric 101 and an epoxy adhesive film 401 and an expanded aluminum foil 501 were provided and used to prepare composite specimen 80C. More specifically, the following materials were assembled and prepared as described in "General Tooling and Bagging of a Composite Part" above. Applied first to the tool was a 4 mil thick expanded aluminum foil 501 available as Exmet 4AL8-080 from Dexmet. Then applied was an epoxy adhesive film 401 which includes a non-woven polyester veil at 0.05 lbs./sqft available as 3M™ Scotch-Weld™ Structural Adhesive Film AF 555M from 3M Company. Lastly applied was 6 plies of epoxy resin impregnated into woven fiberglass 7781 fabric 101 available as 7781 38 F164-6 from Hexcel. The curable resins in this assembly were cured as described in "Low Pressure 1½ Hour Curing of a Composite Part" above.

Cured Laminate With Adhesive Surfacing Film, 84C (Comparative)

Figure 11:
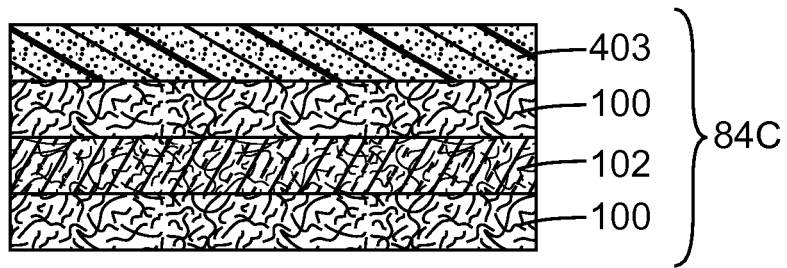
FIG. 11 is schematic depiction of a comparative composite laminate as described in the Examples below.

With reference to FIG. 11, epoxy resin impregnated carbon fiber fabric 100, 102 and an epoxy adhesive film 403 were provided and used to prepare a composite specimen. More specifically, the following materials were assembled and prepared as described in "General Tooling and Bagging of a Composite Part" above. Applied first to the tool was an epoxy adhesive film 403 which includes a non-woven polyester veil available as Surface Master™ 905 from Cytec. Then applied was 1 ply epoxy resin impregnated carbon fiber fabric 100, graphite fabric 3K-70-PW available as Cycom 970/PWC FT300 3K UT from Cytec. Then applied was 8 plies epoxy resin impregnated unidirectional graphite fibers 102 available as P2353U 19 152 from Toray. Lastly applied was 1 ply epoxy resin impregnated carbon fiber fabric 100, graphite fabric 3K-70-PW available as Cycom 970/PWC FT300 3K UT from Cytec. The curable resins in this assembly were cured as described in "High Pressure Curing of a Composite Part" above.

Cured Core Laminate With 1 Barrier Film on Adhesive Film, 61

With reference to FIG. 3, epoxy resin impregnated glass fiber fabric 101, glass fabric reinforced honeycomb core 103 and a barrier modified surfacing film 20 were provided and used to prepare a composite specimen 61. More specifically, the following materials were assembled and prepared as described in "General Tooling and Bagging of a Composite Part" above. Applied first to the tool was an 8.5 mil thick barrier modified surfacing film 20, prepared as described above, which was applied with the barrier layer closest to the tool and the adhesive layer exposed. Then applied were 2 plies of epoxy resin impregnated into woven fiberglass 7781 fabric 101 available as 7781 38 F164-6 from Hexcel. Then applied was a ½ inch thick glass fabric reinforced hexagonal honeycomb core 103 which includes a heat-resistant phenolic resin, available as HRP-3/16-8.00 from Hexel. Lastly applied were 2 more plies of epoxy resin impregnated into woven fiberglass 7781 fabric 101 available as 7781 38 F164-6 from Hexcel. The curable resins in this assembly were cured as described in "Low Pressure 1½ Hour Curing of a Composite Part" above.

Cured Core Laminate With 1 Barrier Film on Adhesive Film, 81

With reference to FIG. 4, epoxy resin impregnated glass fiber fabric 101, glass fabric reinforced honeycomb core 103 and a barrier modified surfacing film 24 were provided and used to prepare a composite specimen 81. More specifically, the following materials were assembled and prepared as described in "General Tooling and Bagging of a Composite Part" above. Applied first to the tool was a 13.5 mil thick barrier modified surfacing film 24, prepared as described above, which was applied with the barrier layer closest to the tool and the adhesive layer exposed. Then applied were 2 plies of epoxy resin impregnated into woven fiberglass 7781 fabric 101 available as 7781 38 F164-6 from Hexcel. Then applied was a ½ inch thick glass fabric reinforced hexagonal honeycomb core 103 which includes a heat-resistant phenolic resin, available as HRP-3/16-8.00 from Hexel. Lastly applied were 2 more plies of epoxy resin impregnated into woven fiberglass 7781 fabric 101 available as 7781 38 F164-6 from Hexcel. The curable resins in this assembly were cured as described in "Low Pressure 1½ Hour Curing of a Composite Part" above.

Cured Core Laminate With 2 Barrier Films on Adhesive Film, 62

With reference to FIG. 5, epoxy resin impregnated glass fiber fabric 101, glass fabric reinforced honeycomb core 103 and a multi-layered barrier modified surfacing film 21 were provided and used to prepare a composite specimen 62. More specifically, the following materials were assembled and prepared as described in "General Tooling and Bagging of a Composite Part" above. Applied first to the tool was a 10.5 mil thick multi-layered barrier modified surfacing film 21, prepared as described above, which was applied with the barrier layers closest to the tool and the adhesive layer exposed. Then applied were 2 plies of epoxy resin impregnated into woven fiberglass 7781 fabric 101 available as 7781 38 F164-6 from Hexcel. Then applied was a ½ inch thick glass fabric reinforced hexagonal honeycomb core 103 which includes a heat-resistant phenolic resin, available as HRP-3/16-8.00 from Hexel. Lastly applied were 2 more plies of epoxy resin impregnated into woven fiberglass 7781 fabric 101 available as 7781 38 F164-6 from Hexcel. The curable resins in this assembly were cured as described in "Low Pressure 1½ Hour Curing of a Composite Part" above.

Cured Core Laminate With 2 Barrier Films on Adhesive Film, 82

With reference to the FIG. 6, epoxy resin impregnated glass fiber fabric 101, glass fabric reinforced honeycomb core 103 and multi-layered barrier modified surfacing film 26 were provided and used to prepare a composite specimen 82. More specifically, the following materials were assembled and prepared as described in "General Tooling and Bagging of a Composite Part" above. Applied first to the tool was a 15.5 mil thick multi-layered barrier modified surfacing film 26, prepared as described above, which was applied with the barrier layers closest to the tool and the adhesive layer exposed. Then applied were 2 plies of epoxy resin impregnated into woven fiberglass 7781 fabric 101 available as 7781 38 F164-6 from Hexcel. Then applied was a ½ inch thick glass fabric reinforced hexagonal honeycomb core 103 which includes a heat-resistant phenolic resin, available as HRP-3/16-8.00 from Hexel. Lastly applied were 2 more plies of epoxy resin impregnated into woven fiberglass 7781 fabric 101 available as 7781 38 F164-6 from Hexcel. The curable resins in this assembly were cured as described in "Low Pressure 1½ Hour Curing of a Composite Part" above.

Cured Laminate With EAF, Adhesive Film and 2 Barrier Films, 63

With reference to FIG. 7, epoxy resin impregnated glass fiber fabric 101 and multi-layered barrier modified conductive surfacing film 22 were provided and used to prepare a composite specimen 63. More specifically, the following materials were assembled and prepared as described in "General Tooling and Bagging of a Composite Part" above. Applied first to the tool was a 14.5 mil thick multi-layered barrier modified surfacing film 22, prepared as described above, which was applied with the expanded aluminum foil 501 closest to the tool and the barrier layers exposed. Lastly applied were 6 plies of epoxy resin impregnated into woven fiberglass 7781 fabric 101 available as 7781 38 F164-6 from Hexcel. The curable resins in this assembly were cured as described in "Low Pressure 2 Hour Curing of a Composite Part" above.

Cured Laminate With EAF, Adhesive Film and a Barrier Layer Each Side of VEM, 83

With reference to FIG. 8, epoxy resin impregnated glass fiber fabric 101 and a modified visco-elastic conductive surfacing film 23 were provided and used to prepare a composite specimen 83. More specifically, the following materials were assembled and prepared as described in "General Tooling and Bagging of a Composite Part" above. Applied first to the tool was a 15 mil thick modified visco-elastic conductive surfacing film 23, prepared as described above, which was applied with the expanded aluminum foil 501 closest to the tool and the barrier layer exposed. Lastly applied were 6 plies of epoxy resin impregnated into woven fiberglass 7781 fabric 101 available as 7781 38 F164-6 from Hexcel. The curable resins in this assembly were cured as described in "Low Pressure 2 Hour Curing of a Composite Part" above.

Cured Laminate—CRFP With 1 Barrier Film, 85

Figure 12:
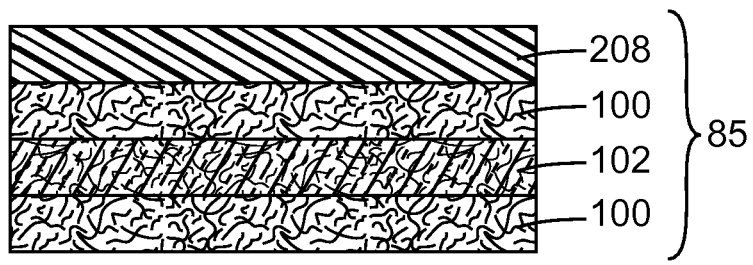
FIG. 12 is schematic depiction of a fiber reinforced resin matrix composite laminate including a surfacing construction according to the present disclosure, as described in the Examples below.

With reference to FIG. 12, epoxy resin impregnated carbon fiber tape 100 and a fluoropolymer surfacing film 208 were provided and used to prepare a composite specimen 85. More specifically, the following materials were assembled and prepared as described in "General Tooling and Bagging of a Composite Part" above. Applied first to the tool was a 1 mil thick film of fluoropolymer 208. Then applied was 1 ply epoxy resin impregnated carbon fiber fabric 100, graphite fabric 3K-70-PW available as Cycom 970/PWC FT300 3K UT from Cytec. Then applied was 8 plies epoxy resin impregnated unidirectional graphite fibers 102 available as P2353U 19 152 from Toray. Lastly applied was 1 ply epoxy resin impregnated carbon fiber fabric 100, graphite fabric 3K-70-PW available as Cycom 970/PWC FT300 3K UT from Cytec. Each type of fluoropolymer film 208 recited above was used to create a separate specimen. The curable resins in this assembly were cured as described in "High Pressure Curing of a Composite Part" above.

Cured Laminate—CRFP With 1 Barrier Film on Adhesive Film, 86

With reference to FIG. 13, epoxy resin impregnated carbon fiber tape 100 and a multi-layered surfacing film 25 were provided and used to prepare a composite specimen 86. More specifically, the following materials were assembled and prepared as described in "General Tooling and Bagging of a Composite Part" above. Applied first to the tool was a 9 mil thick barrier modified surfacing film 25, prepared as described above, which was applied with the fluoropolymer barrier layer closest to the tool and the adhesive layer exposed. Then applied was 1 ply epoxy resin impregnated carbon fiber fabric 100, graphite fabric 3K-70-PW available as Cycom 970/PWC FT300 3K UT from Cytec. Then applied was 8 plies epoxy resin impregnated unidirectional graphite fibers 102 available as P2353U 19 152 from Toray. Lastly applied was 1 ply epoxy resin impregnated carbon fiber fabric 100, graphite fabric 3K-70-PW available as Cycom 970/PWC FT300 3K UT from Cytec. Each multi-layered surfacing film 25, made with each type of fluoropolymer film 208 recited above, was used to create a separate specimen. The curable resins in this assembly were cured as described in "High Pressure Curing of a Composite Part" above.

Cured CFRP Laminate With Transparent EMI Shield, 70

With reference to the FIG. 9, epoxy resin impregnated carbon fiber fabric 100 and a multi-layered transparent EMI shield surfacing film 30 were provided and used to prepare a composite specimen. More specifically, the following materials were assembled and prepared as described in "General Tooling and Bagging of a Composite Part" above. Applied first to the tool was a 4 mil multi-layered transparent EMI shield surfacing film 30, prepared as described above, which was applied with the 4 mil polyester film 207 closest to the tool. Lastly applied was 7 plies epoxy resin impregnated carbon fiber fabric 100, graphite fabric 3K-70-PW available as Cycom 970/PWC FT300 3K UT from Cytec. The curable resins in this assembly were cured as described in "High Pressure Curing of a Composite Part" above.

Cured CFRP Laminate With ECF, Surfacing Film and Transparent EMI Shield, 71

With reference to FIG. 10, epoxy resin impregnated carbon fiber fabric 100 and a conductive surfacing film with a multi-layered EMI shield 31 were provided and used to prepare a composite specimen 71. More specifically, the following materials were assembled and prepared as described in "General Tooling and Bagging of a Composite Part" above. Applied first to the tool was a 12 mil conductive surfacing film with a multi-layered EMI shield 31, prepared as described above, which was applied with the 4 mil polyester film 207 closest to the tool. Lastly applied was 7 plies epoxy resin impregnated carbon fiber fabric 100, graphite fabric 3K-70-PW available as Cycom 970/PWC FT300 3K UT from Cytec. The curable resins in this assembly were cured as described in "High Pressure Curing of a Composite Part" above.

Cured CFRP Laminate With Conductive Fluoropolymer Barrier Layer, 72

Figure 14:
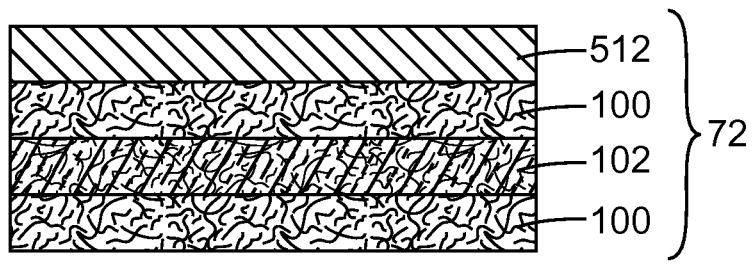
FIG. 14 is schematic depiction of a fiber reinforced resin matrix composite laminate including a surfacing construction according to the present disclosure, as described in the Examples below.

With reference to FIG. 14, epoxy resin impregnated carbon fiber fabric 100 and a conductive fluoropolymer barrier layer 513 were provided and used to prepare a composite specimen 72. More specifically, the following materials were assembled and prepared as described in "General Tooling and Bagging of a Composite Part" above. Applied first to the tool was 1 mil thick conductive fluoropolymer barrier layer 513. Then applied was 1 ply epoxy resin impregnated carbon fiber fabric 100, graphite fabric 3K-70-PW available as Cycom 970/PWC FT300 3K UT from Cytec. Then applied was 8 plies epoxy resin impregnated unidirectional graphite fibers 102 available as P2353U 19 152 from Toray. Lastly applied was 1 ply epoxy resin impregnated carbon fiber fabric 100, graphite fabric 3K-70-PW available as Cycom 970/PWC FT300 3K UT from Cytec. Each type of conductive fluoropolymer barrier layer 513 recited above was used to create a separate specimen. The curable resins in this assembly were cured as described in "High Pressure Curing of a Composite Part" above.

Cured CFRP Laminate With Conductive Foil on a Barrier Layer, 74

Figure 15:
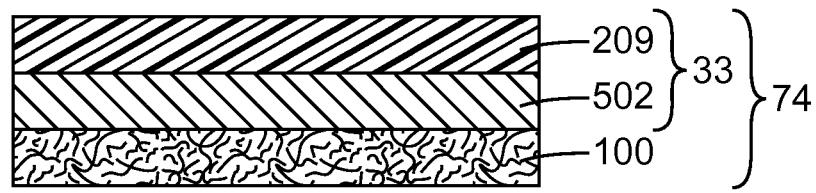
FIG. 15 is schematic depiction of a fiber reinforced resin matrix composite laminate including a surfacing construction according to the present disclosure, as described in the Examples below.

With reference to FIG. 15, epoxy resin impregnated carbon fiber fabric 100 and a conductive surfacing film 33 were provided and used to prepare a composite specimen 74. More specifically, the following materials were assembled and prepared as described in "General Tooling and Bagging of a Composite Part" above. Applied first to the tool was a 1 mil conductive surfacing film 33, prepared as described above, which was applied with the fluoropolymer barrier layer closest to the tool and the metal layer exposed. Lastly applied was 8 plies epoxy resin impregnated carbon fiber fabric 100, graphite fabric 3K-70-PW available as Cycom 970/PWC FT300 3K UT from Cytec. The curable resins in this assembly were cured as described in "High Pressure Curing of a Composite Part" above.

Cured CFRP Laminate With Conductive Surfaced Barrier Layer, 75

Figure 16:
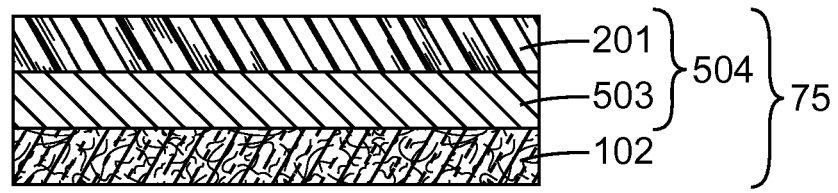
FIG. 16 is schematic depiction of a fiber reinforced resin matrix composite laminate including a surfacing construction according to the present disclosure, as described in the Examples below.

With reference to FIG. 16, epoxy resin impregnated carbon fiber fabric 102 and a conductive surfacing film 504 were provided and used to prepare a composite specimen 75. More specifically, the following materials were assembled and prepared as described in "General Tooling and Bagging of a Composite Part" above. Applied first to the tool was conductive surfacing film 504, available from Cima NanoTech, which is a 2 mil transparent polyester film 201 coated on one side with silver nanoparticles 503 and dried to form a conductive surface. Conductive surfacing film 504 was applied with the polyester film 201 closest to the tool and the conductive layer 503 exposed. Lastly applied was 8 plies epoxy resin impregnated unidirectional graphite fibers 102 available as P2353U 19 152 from Toray. The curable resins in this assembly were cured as described in "High Pressure Curing of a Composite Part" above.

Cured CFRP Laminate With Conductive Surfaced Barrier Layer, 76

Figure 17:
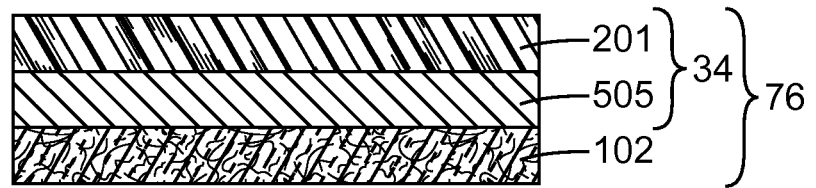
FIG. 17 is schematic depiction of a fiber reinforced resin matrix composite laminate including a surfacing construction according to the present disclosure, as described in the Examples below.

With reference to FIG. 17, epoxy resin impregnated carbon fiber fabric 102 and a conductive surfacing film 34 were provided and used to prepare a composite specimen 76. More specifically, the following materials were assembled and prepared as described in "General Tooling and Bagging of a Composite Part" above. Applied first to the tool was a 2 mil transparent polyester film with a 300 nm thick copper screen 34, prepared as described above, which was applied with the polyester surface closest to the tool and the conductive face exposed. Lastly applied was 8 plies epoxy resin impregnated unidirectional graphite fibers 102 available as P2353U 19 152 from Toray. The curable resins in this assembly were cured as described in "High Pressure Curing of a Composite Part" above.

Evaluation

After curing, coupons from example 60, 80C, 84C, 61, 81, 62, 82, 63, 83, 85, 86, 70, and 71 were inspected for surface defects. The results from these observations are reported in Table 1.

Example 61, 81, 62, 82, 85, 86, 70, and 71 all included one or more barrier layers with UV absorbers or stabilizers.

Example 63 included barrier layers between the conductive metal mesh and the fiber reinforcement of the composite lay-up. Example 83 included barrier layers and a viscoelastic vibration damping layer between the conductive metal mesh and the fiber reinforcement of the composite lay-up.

TABLE 1

| Ex. | Pin holes | Pits | Fiber to Surface | Mesh to Surface | Mesh to Fiber | Resin Migration |
|---|---|---|---|---|---|---|
| | | | Minimum Distance | | | |
| 60C | yes | yes | n/a | not evaluated | not evaluated | not evaluated |
| 80C | yes <2> | yes | n/a | mesh exposed | mesh contacting fibers | yes <1> |
| 84C | yes | no | n/a | n/a | n/a | not evaluated |
| 61 | no | no | not evaluated | n/a | n/a | not evaluated |
| 81 | no | no | thickness of barrier layer | n/a | n/a | not evaluated |
| 62 | no | no <3> | not evaluated | n/a | n/a | not evaluated |
| 82 | no | no <3> | not evaluated | n/a | n/a | not evaluated |
| 63 | no | yes | n/a | variable but not exposed | thickness of barrier layer | no |
| 83 | no | yes | n/a | variable but not exposed | thickness of barrier layer <4> | no |
| 85 | no | no | n/a | n/a | n/a | not evaluated |
| 86 | no | no | n/a | n/a | n/a | not evaluated |
| 70 | no | no | n/a | n/a | n/a | not evaluated |
| 71 | no | no | not evaluated | not evaluated | not evaluated | not evaluated |

<1> Surfacing film migrated at least into the second ply of fiberglass fabric.
<2> The pin-holes extended through the layer of metal mesh and the first layer of fiberglass fabric into the second layer of fiberglass fabric.
<3> Surface glossy exhibiting spectral reflectance.
<4> The conjoined barrier layers and visco-elastic damping polymer appear constant thickness and assumed an undulating path between the metal mesh and the first layer of fiberglass fabric.

After curing, coupons from example 84C, 85, 86, 72, 74, 75, and 76 were examined for selected electromagnetic properties of the coupons and resistance to paint strippers. The observations are reported in Table 2.

TABLE 2

| Ex. | Surface Conductivity* ($\Omega$/square) | Static Dissipation** (seconds) | Change in Pencil Hardness per ASTM 3363**** | Paint Adhesion per ASTM D3359**** Before exposure to paint stripper*** | Paint Adhesion per ASTM D3359**** After 24 hr exposure to paint stripper*** | EMI Shielding Efficiency (dB) ***** |
|---|---|---|---|---|---|---|
| 84C | $10^{16}$ | not evaluated | >8 | 5B | 3B | 54 |
| 85 | not evaluated | not evaluated | <2 | 5B for PVDF | 5B for PVDF | not evaluated |
| 86 | not evaluated | not evaluated | <2 | 5B for PVDF | 5B for PVDF | not evaluated |
| 72 | $10^{15}$-$10^{7}$ | <0.01 <2> | not evaluated | 4B<3> | 5B<3> | not evaluated |
| 74 | not evaluated | not evaluated | not evaluated | not evaluated | not evaluated | 57 |
| 75 | $10^{15}$ | <0.01 | not evaluated | not evaluated | not evaluated | 57 |

TABLE 2-continued

| Ex. | Surface Conductivity* (Ω/square) | Static Dissipation** (seconds) | Change in Pencil Hardness per ASTM 3363**** | Paint Adhesion per ASTM D3359**** Before exposure to paint stripper*** | Paint Adhesion per ASTM D3359**** After 24 hr exposure to paint stripper*** | EMI Shielding Efficiency (dB) ***** |
|---|---|---|---|---|---|---|
| 76 | 10¹¹ | <0.01 | not evaluated | not evaluated | not evaluated | 58 |

*per ASTM D257
**Time to dissipate 90% of 5 kVolts measured in an Electro Tech systems model 406C Static Decay Meter.
***Measured after applying one coat PRC-Desoto CA7501HS primer.
****Measured before and after saturating the surface for 24 hours with a paint stripper such as Cee-Bee ® E2012A available from McGean at a rate of 0.2 grams/cm². ASTM D3359 Adhesion Classifications are as recited in Table 3.

TABLE 3

| Adhesion Classification | Amount of Area Removed |
|---|---|
| 0B | >65% |
| 1B | 35%-65% |
| 2B | 15%-35% |
| 3B | 5%-15% |
| 4B | <15% |
| 5B | None |

***** Electromagnetic Interference (EMI) Shielding Efficiency measured from 1 to 18 GHz per IEEE299 using a dual chamber configuration.
<2> Evaluated on the PVDF with multiwalled carbon nano-tubes only.
<3> Evaluated on the THV with multiwalled carbon nano-tubes only.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A fiber reinforced resin matrix composite laminate comprising:
   a) at least one layer of fiber reinforced resin matrix comprising a cured resin matrix; and
   b) a surfacing construction bound to the cured resin matrix and forming a surface of the laminate, comprising:
   i) at least one barrier layer, wherein the barrier layer comprises at least one of polyethylene, polyurethane, polycarbonate and polyimide and is substantially impermeable to moisture, oxygen, and an organic solvent selected from methylene chloride, benzyl alcohol and gasoline; and
   ii) at least one cured adhesive layer derived from high temperature cure adhesive comprising a dicyandiamide-cured epoxy adhesive;
   wherein at least one cured adhesive layer is directly bound to the cured resin matrix and wherein at least one cured adhesive layer is directly and continuously bound to at least one barrier layer; and
   wherein the barrier layer(s) have a composition different from that of the cured adhesive layer(s), the barrier layer(s) have a composition different from that of the cured resin matrix, and the cured adhesive layer(s) have a composition different from that of the resin matrix;
   wherein the high temperature cure adhesive cures in less than 6 hours at a temperature of greater than 180° C. and fails to cure in 48 hours at a temperature of less than 25° C.

2. The fiber reinforced resin matrix composite laminate according to claim 1 wherein the surfacing construction additionally comprises:
   iii) at least one electrically conductive layer.

3. The fiber reinforced resin matrix composite laminate according to claim 1 wherein the surfacing construction additionally comprises:
   iv) at least one EMI shield layer.

4. The fiber reinforced resin matrix composite laminate according to claim 1 wherein the surfacing construction additionally comprises:
   v) at least one UV protection layer.

5. The fiber reinforced resin matrix composite laminate according to claim 1 wherein the surfacing construction additionally comprises:
   vi) at least one viscoelastic layer having a peak damping ratio (Tan δ) of at least 1.0 as measured in shear mode by DMTA at 10 Hz.

6. The fiber reinforced resin matrix composite laminate according to claim 1 wherein at least one barrier layer comprises a fluoropolymer.

7. The fiber reinforced resin matrix composite laminate according to claim 1 wherein at least one barrier layer comprises a non-perfluorinated fluoropolymer.

8. The fiber reinforced resin matrix composite laminate according to claim 1 wherein the at least one barrier layer comprises non-perfluorinated fluoropolymer.

* * * * *